United States Patent [19]

Mayer

[11] 3,993,941

[45] Nov. 23, 1976

[54] PARALLELOGRAM TRANSMISSION USED FOR GENERATING A PRESSING FORCE, PARTICULARLY IN A HOUSEHOLD REFUSE COMPACTOR

[75] Inventor: Rolf Mayer, Giengen, Germany

[73] Assignee: Bosch-Siemens Hausgerate GmbH, Munich, Germany

[22] Filed: May 21, 1975

[21] Appl. No.: 579,501

[30] Foreign Application Priority Data

May 24, 1974 Germany ............................ 2425245

[52] U.S. Cl. ..................................... 318/264; 318/9; 318/476

[51] Int. Cl.[2] ............................................ H02P 3/06

[58] Field of Search ............... 318/9, 10, 11, 14, 15, 318/256, 264–266, 280, 282, 286, 434, 469, 476, 477

[56] References Cited

UNITED STATES PATENTS

| | | | |
|---|---|---|---|
| 2,651,988 | 9/1953 | Thomas et al. | 318/264 X |
| 3,498,434 | 3/1970 | Richmond | 318/264 X |
| 3,682,072 | 8/1972 | Hess et al. | 318/9 X |
| 3,714,537 | 1/1973 | Bur | 318/286 X |
| 3,812,408 | 5/1974 | Penn et al. | 318/476 X |

*Primary Examiner*—Robert K. Schaefer
*Assistant Examiner*—W. E. Duncanson, Jr.
*Attorney, Agent, or Firm*—Michael J. Striker

[57] ABSTRACT

An arrangement for generating and causing a pressing member to exert a pressing force includes an electric drive motor and a parallelogram transmission connected to the pressing member for transmitting pressing force thereto. The parallelogram transmission is coupled to and driven by the electric drive motor through a displacing member having the form of a screw spindle. An adjustable-setting switching device terminates operation of the motor when the output torque of the motor reaches a value corresponding to the setting of the switching device. The parallelogram transmission has a transmission ratio which in an undesirable manner is a function of the extent of displacement of the parallelogram transmission. Compensation of the functional dependence of the transmission ratio upon the extent of displacement of the parallelogram transmission is effected by automatically adjusting the displacement of the switching device in dependence upon the extent of the displacement of the parallelogram transmission.

8 Claims, 5 Drawing Figures

PARALLELOGRAM TRANSMISSION USED FOR GENERATING A PRESSING FORCE, PARTICULARLY IN A HOUSEHOLD REFUSE COMPACTOR

BACKGROUND OF THE INVENTION

The invention relates to parallelogram transmission used for producing a pressing force, particularly in household refuse compactors.

More particularly, the invention relates to parallelogram transmissions such as of the kind wherein the transmission is itself driven by a displacing member which produces a substantially straight-line motion, such as a screw spindle or the like, with the latter in turn being driven by an electromotor in whose current path there is provided a switching device operative for either turning the drive motor off or reversing its direction when a predetermined motor current and/or a predetermined pressing force has been reached.

With known parallelogram transmissions of this general type, to the extent that they are employed for force transmission and not for pure motion transmission or motion generation, there is the disadvantage that the maximum force exerted by a ram connected to and driven through the parallelogram transmission is not constant for a given output torque of the drive motor which drives the transmission. In the first place, the transmission ratio of the parallelogram transmission is not a constant, but varies as a function of the transmission displacement, i.e., varies as the ram moves from its starting position to its end-of-stroke position. The functional dependence of the transmission ratio upon the displacement of the parallelogram transmission, and upon the ram position, is essentially a tangential function. Accordingly, if it is assumed that the drive motor output torque is the same at the end of every ram stroke, from one ram stroke to the next, and if the successive ram strokes are of different length, then the maximum pressing force exerted by the ram (at the end of its stroke) will be greater for long strokes than for short strokes. Indeed, for long strokes the maximum pressing force exerted by the ram (at the end of its stroke) will be a multiple of the maximum pressing force which it exerts (at the end of its stroke) during the performance of short strokes.

This is particularly undesirable when the drive motor is turned off or reversed, thereby ending the ram stroke, when the drive motor output torque reaches a preselected maximum value. The drive motor output torque can be measured directly and compared against the preselected maximum value, but usually use is simply made of a switching device connected in the drive motor current path and operative for sensing the motor torque indirectly, by sensing the motor current, and for turning off or reversing the motor when the motor current reaches a preselected maximum value assumed to correspond to the preselected maximum torque.

Specifically, a problem is constituted by the selection of the motor output torque, or equivalently the motor current, at which the motor should be automatically turned off or reversed, i.e., at which the ram stroke should be terminated. When the maximum value of the motor torque has been preselected, then the maximum pressing force which can be developed by the ram during the performance of its stroke increases as the ram moves farther and farther from its starting position. If a certain minimum pressing force is required over the whole range of movement of the ram, or over at least the middle part of the range of movement of the ram, then the dimensioning of the motor, transmission and stress-bearing components of the apparatus must be based upon the maximum compacting force which can be developed by the ram when it is still not very far from its starting position. But if this is done, and if the ram is made to perform a series of strokes of different respective lengths, then the maximum compacting force which can be exerted by the ram (at the end of its stroke) will for longer strokes be markedly greater than really necessary for the pressing operation, while for the shorter strokes the maximum compacting force which can be exerted by the ram (at the end of its stroke) will be only just sufficient for satisfactory pressing.

It is possible to use such a parallelogram transmission to move the compacting ram of a household refuse compactor, also using the abovedescribed expedient of automatically shutting off or reversing the drive motor and thereby ending the ram stroke, when the drive motor output torque or else the drive motor current reaches a preselected value. However, if this is done, then the resulting dependence of the maximum force which can be exerted by the compacting ram upon the position of the ram relative to its starting position, proves to be particularly disadvantageous, because of the special operating requirements involved.

This is because it is usual to compact the refuse in the container of the compactor in a layer-by-layer fashion; when the container is almost filled with a layer of loose refuse above layers of compacted refuse, the compacting ram is made to perform a stroke, so as to compact the loose refuse. The upper section of the container, as a result of such compacting, becomes free for the receipt of additional loose refuse. When additional loose refuse has substantially filled the upper section of the container, the compacting ram is made to perform another stroke, again compacting the loose refuse. This operation is repeated until the container of the compactor is filled to a predetermined level with compacted refuse, whereupon the container is entirely emptied or replaced by an empty container.

With this layer-by-layer compacting, the successive ram strokes are of shorter and shorter length, due to the growing height of the compacted refuse. Accordingly, the maximum compacting force developed by the ram (at the end of its stroke), during a series of successive progressively shorter strokes, reaches the highest value only during the first such stroke, i.e., only once. Nevertheless, it is necesssary that the parts of the refuse compactor which are subjected to mechanical stresses during the compacting operation be dimensioned to withstand the stresses arising during the exertion of the greatest compacting force, namely at the end of the first and longest stroke. This highest compacting force is a multiple of the force sufficient for satisfactory compacting of the refuse. Accordingly, the parts of the compactor subjected to mechanical stresses must be much more stable, strong and expensive than would be necessary if the maximum compacting force developed by the ram (at the end of its stroke) were the same from one ram stroke to the next and had only the value necessary for the desired degree of compacting effectiveness.

Likewise, if it is desired to limit the compacting force which can be developed by the ram to a value just sufficient for satisfactory compacting of the refuse, then one must recognize and accept that the degree of compaction will progressively decrease from one ram stroke to the next. This is because the aforedescribed shut-off or reversing device for the drive motor causes the drive motor output torque to be the same at the end of each successive ram stroke, despite the progressive decrease of the stroke length from one stroke to the next. Accordingly, the maximum compacting force exerted by the ram (at the end of the ram stroke) will become smaller and smaller, from one ram stroke to the next, the exact rerlationship between the length of the ram stroke and the maximum compacting force developed at the end of the respective stroke being the essentially tangential relationship between the displacement of the parallelogram transmission and its transmission ratio. But if this approach is taken — i.e., limiting the compacting force which can be developed by the ram to a value just sufficient for satisfactory compacting of the refuse — then, during the last ram strokes in a series of such strokes, a compacting force sufficient for satisfactory compacting and for the crushing of strong and hard components of the refuse, such as empty cans, bottles and the like, can no longer be achieved.

If, in contrast, the household refuse compactor and the parallelogram transmission thereof are dimensioned to ensure that the minimum necessary compacting force will always be reached during operation, despite the progressive decrease of the ram stroke length, then, besides the above-discussed disadvantageous effect upon manufacturing costs and upon the weight of the apparatus, there becomes necessary a very disadvantageous overdimensioning of the parallelogram transmission and of all the stress-bearing components of the refuse compactor, as well as substantially larger dimensions for the drive motor of the compactor. All this is disadvantageous in terms of energy consumption, space requirements and weight of the apparatus.

With another apparatus already known and available commercially, an attempt has been made to eliminate the difficulties associated with the transmission-ratio/-displacement curve of the particular parallelogram transmission employed, by making use of helical tension springs. These tension springs are arranged parallel to the screw spindle in such a manner as to become relieved as the compacting ram descends and to become stressed again when the ram performs its return movement. These springs are intended to compensate for the undesirable transmission-ratio/displacement curve of the parallelogram transmission by supplementing the initially low compacting force. However, the increase of the compacting force afforded by the helical springs turns out to be very unsatisfactory, because the screw spindle drive serving to move the parallelogram transmission is self-locking, so that the stressed helical springs contribute to a substantial increase of the friction in the entire drive and transmission arrangement.

The use of helical springs to compensate for the lower compacting force during the shorter ram strokes has the further disadvantage that, when the compacting ram is in the raised or rest position, the parallelogram transmission is subjected to the full stressing of the helical springs. This is detrimental for the mountings and moving parts of the transmission. Furthermore, the use of helical springs of the requisite strength and length can detrimentally influence the dimensions requisite for the parallelogram transmission.

Because of the aforedescribed displacement/transmission-ratio curve of the parallelogram transmission, such parallelogram transmissions are only seldom employed for driving household refuse compactors, even though in this particular application the parallelogram transmission, due to the small space it takes up when the compacting ram is in the raised or rest position, is of great advantage and markedly superior to the otherwise conventional use of a screw spindle for direct drive of the compacting ram.

SUMMARY OF THE INVENTION

It is accordingly a general object of the invention to adapt a parallelogram transmission to the special operating requirements of a household refuse compactor using simple expedients and by appropriately controlling the drive motor of the compactor, so as to eliminate the disadvantages resulting from the displacement/transmission-ratio curve of the parallelogram transmission.

This object, and others which will become more understandable from the description, below, of preferred embodiments, can be met, according to one advantageous concept of the invention, by associating with the motor-load-dependent switching device, which effects turn-off or direction-reversal of the drive motor upon the reaching of a preselected maximum motor output torque or corresponding motor current, a compensating device which is adjustable for varying the value of the torque or motor current to which switching device for the drive motor responds. The setting of the compensating device is advantageously automatically adjusted as a function of the displacement of the parallelogram transmission, to progressively change the response current or response torque of the motor switching device in such a manner that the maximum compacting pressure exerted by the ram (at the end of its downward stroke) is the same from one ram stroke to the next, despite the fact that the successive strokes are of progressively shorter length, either completely irrespective of the stroke length or else irrespective of the stroke length so long as the stroke lengths are within a predetermined range of lengths. This predetermined range of stroke lengths would correspond, for example, to the range of ram positions within which the ram must be expected to exert considerable force in opposition to the resisting force of partially compacted refuse. Usually, it is to be assumed that the space at the top of the container will never become filled with compacted refuse but will instead contain only loose refuse prior to compaction of the latter. In such event, it is sufficient that the end-of-stroke compacting force exerted by the compacting ram be constant, independent of stroke length, only for that range of stroke lengths corresponding to end-of-stroke ram positions lower than the highest level to which the compacted refuse can be expected to build.

According to one advantageous concept of the invention, an overload relay is used as the motor switching device, and connected in parallel to the relay is a potentiometer whose wiper setting is automatically controlled in dependence upon the displacement of the parallelogram transmission. In this way, the desired compensation for the displacement/transmission-ratio relationship of the parallelogram transmission is achieved by a mere corresponding adjustment of the potentiometer in dependence upon the extent of displacement of the parallelogram transmission at any particular moment.

According to another advantageous concept of the invention, the potentiometer wiper is directly or indirectly coupled with the member which effects displacement of the parallelogram transmission. To effect such coupling, use can be made of a great variety of devices, such as lever transmissions, gear transmissions, cam and cam-drum transmissions, and cable drives and hydraulic drives controlled by such transmissions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
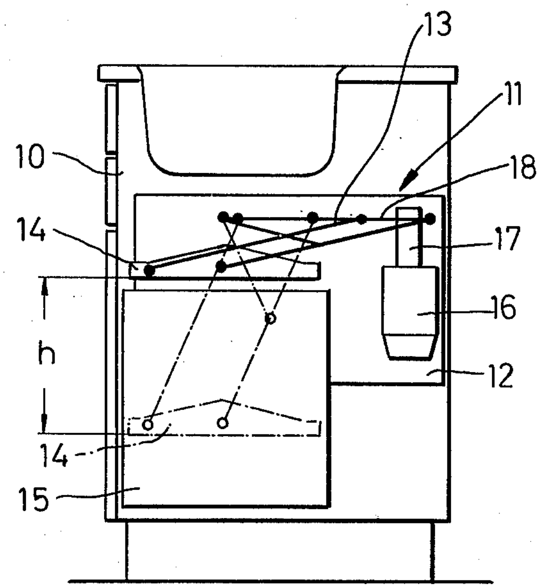
FIG. 1 depicts schematically the housing of a module of a modular kitchen arrangement, accommodating a household refuse compactor provided with a parallelogram transmission between the drive motor and the compacting ram.

In FIG. 1, there is built into the housing 10 of a module of a modular kitchen arrangement a household refuse compactor 11. The compactor 11 is essentially comprised of a frame 12, a parallelogram transmission 13 arranged within the confines of the frame 12, a compacting ram 14 coupled to and moved by the transmission 13, and a container 15 for accommodating the already compacted or yet to be compacted refuse. The parallelogram transmission 13 which drives the compacting ram 14 is itself driven by means of an electric drive motor 16 arranged vertically within the frame 12, the output shaft of the motor 16 driving a screw spindle 18 through the intermediary of a speed-reducing transmission 17.

The screw spindle 18 moves the upper ends of the two parallel levers of the parallelogram transmission 13 jointly between the end positions thereof; in both end positions, the distance between the upper ends of the two levers measured along the length of the screw spindle 18 is the same. The two parallel levers of transmission 13 are shown in sold lines in the position which they assume when the compacting ram 14 is in its upper end position, and are shown in dash-dot lines in the position which they assume when the ram 14 is in its lower end position.

Figure 2:
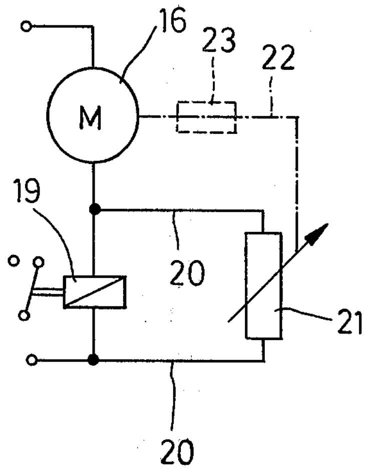
FIG. 2 is a schematic diagram of the circuit of the drive motor, showing its principal switching and control components.

The control of the drive motor 16 can be understood from the simplified circuit diagram of FIG. 2. There is provided in the current path of the electric drive motor 16 an overload relay 19 operative for effecting direction-reversal of the motor. Connected in parallel to relay 19, by means of lines 20, is a potentiometer 21. The potentiometer 21 serves as a compensating device capable of diverting none, a fraction or all of the current passing through the motor away from the current path of the overload relay 19. The wiper of potentiometer 21 is coupled to the output shaft of the drive motor 16 through the intermediary of a linkage 22 indicated in FIG. 2 by dash-dot lines, which can if necessary be supplemented by a transmission 23, for example a speed-reducing transmission.

For the transmission 23 for adjusting the setting of the potentiometer wiper, use can be made, as appropriate, of the screw spindle 18 itself, a special gear transmission driven by the screw spindle 18, or else one of the levers or another part of the parallelogram transmission 13. It would also be possible to adjust the setting of the potentiometer setting by other devices for transmitting force, such as cables or hydraulic means.

Figure 3:
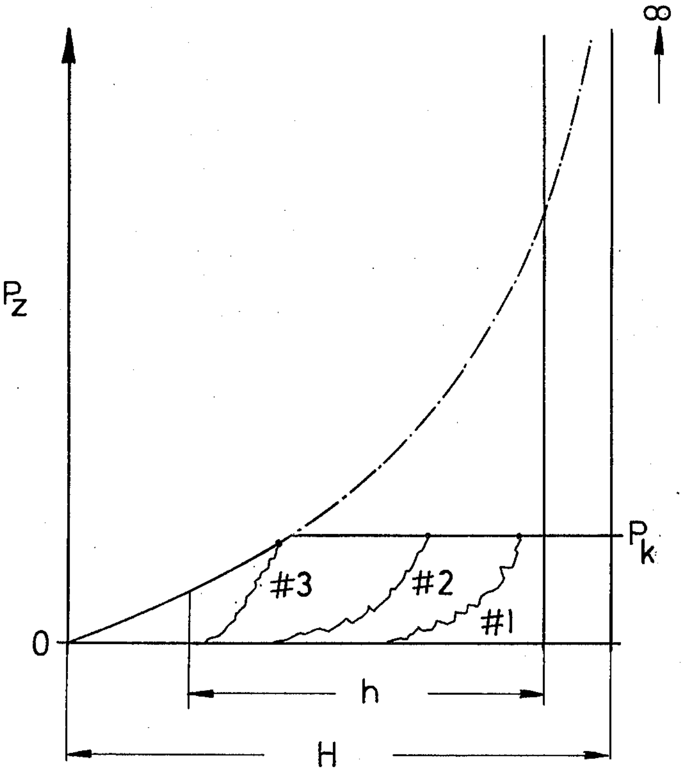
FIG. 3 is a graph showing the relationship of the pressing force developed by the parallelogram transmission as a function of the displacement of the parallelogram transmission, both before and after resort to the compensation expedient of the invention.

FIG. 3 depicts the pressing-force/displacement curve of the parallelogram transmission 13 before and after the compensation has been provided. Along the horizontal axis is plotted the end-of-stroke position of the lower end of the parallelogram transmission levers for strokes of different stroke-length. The origin corresponds to an (imaginary) end-of-stroke position of the lower ends of the levers corresponding to a horizontal orientation of the levers at the level of the screw spindle 18, an orientation which is never actually reached with the illustrated apparatus. The range H is the theoretical range of end-of-stroke positions of the lower ends of the parallelogram transmission levers. The upper limit of the range H corresponds to a fully vertical orientation of the levers, an orientation which is not actually reached with the illustrated apparatus. The range h is the range of end-of-stroke positions which the ends of the levers can actually assume with the illustrated apparatus. The lower limit of the range h corresponds to the end-of-stroke position of the lower ends of the transmission levers at the end of a stroke of zero length, measured relative to the starting position of the levers at the start of the stroke. The upper limit of the range h corresponds to the end-of-stroke position of the lower ends of the transmission levers at the end of the longest stroke which can be performed with the illustrated apparatus.

It will be understood that the ranges H and h can likewise be considered as the theoretical and actual ranges of the end-of-stroke position of the ram 14, since the ram 14 is connected to the lower ends of the parallelogram transmission levers.

Plotted along the vertical axis is the downwardly directed or effective end-of-stroke (maximum) pressing force $P_z$, expressed in kilopounds. $P_k$ represents the preselected absolute highest value which the end-of-stroke pressing force $P_z$ can reach, after the compensation has been provided.

In FIG. 3, the curve which emerges from the origin as a solid line and continues as a dash-dot line, represents the positive branch of a tangent function in the first quadrant of a unit-radius circle. This is a plot of the end-of-stroke pressing force versus the displacement of the lower ends of the parallelogram transmission levers and of the compacting ram 14, without the compensating expedient of the invention.

To make use of this curve, one first determines the lower end position of the ram 14 (or of the lower ends of the transmission levers) during any one stroke, and then marks off on the horizontal axis the value corresponding to this lower end position; the associated value of the ordinate represents the maximum pressing force developed during such stroke, the maximum pressing force being the pressing force exerted at the end of the stroke and accordingly referred to herein as the end-of-stroke pressing force.

As the end-of-stroke position of the ram changes from the position associated with the origin to the position associated with the upper limit of the range H, the end-of-stroke pressing force $P_z$ rises gradually from zero and then steeply towards infinity, when no compensation is provided.

It is to be understood that the uncompensated curve in FIG. 3 is attributable to two factors: first, the tangential variation of the transmission ratio of the parallelogram transmission 13 as a function of the displacement of the parallelogram transmission 13 and, second, the use of a motor current sensor which always terminates the downward stroke of the ram (by stopping or reversing the drive motor) when the motor current reaches a preselected fixed value (set on the overload relay 19) corresponding to a preselected motor output torque. Accordingly, the uncompensated curve results when the end-of-stroke motor output torque is the same for all stroke-lengths. This corresponds to a removal of components 20, 21, 22, 23 from the arrangement of FIG. 2.

In FIG. 2, the provision of the potentiometer 21 in parallel with the overload relay 19 makes it possible to vary the response current value of the motor switching device in a very simple way, by simply adjusting the wiper setting of the potentiometer. By automatically adjusting the wiper setting as a function of the displacement of the parallel transmission levers (and accordingly of the ram), one is in effect adjusting the response current value of the motor switching device as a function of transmission displacement.

The compensation provided by the parallel connection of the overload relay 19 and the potentiometer 21 works as follows:

If the initially loosely piled household refuse accumulated in the container 15 is to be compacted for the first time, when the motor 16 is set into operation by activating a (non-illustrated) start switch. Via the speed-reducing transmission 17, the screw spindle 18 is caused to turn, as a result of which through the intermediary of the parallelogram transmission 13 the compacting ram 14 is caused to descend. The setting of the wiper of the potentiometer 21 is automatically changed during the movement of the parallelogram transmission.

The refuse in the container 15 begins to be compacted when contacted by the descending ram 14. There builds up in the refuse undergoing compaction a counterpressure whose value is initially in the abscissa range *h* and beneath the solid-line curve and the straight line $P_k$. With the usual inhomogeneous composition of the refuse, the counterpressure which builds up, and which corresponds to the pressure exerted by the compacting ram, at first exhibits a fluctuating course in the just-defined range, and then upon further descent of the ram 14 eventually reaches a maximum value represented by the solid-line curve section or the straight line $P_k$ in the range h.

The variation in the compacting force exerted by the ram 14 as the ram 14 descends during the first and longest stroke is shown by fluctuating curve No. 1. It will be noted that the initial portion of curve No. 1 has a value of approximately zero; this is because the ram exerts no compacting force until it actually contacts the upper side of the body of refuse. Thereafter, the compacting force fluctuates in correspondence to the fluctuating resistance offered by the refuse being compacted. When the compacting force reaches the value $P_k$, the fraction of the drive motor current flowing through overload relay 19 has reached the response value of the relay 19, causing the illustrated direction-reversing switch to move to the non-illustrated position, thereby reversing the drive motor direction and accordingly terminating the downward ram stroke. Upon the direction-reversal of the motor, the parallelogram transmission 13 raises the ram 14 back to its starting position. When the ram reaches its starting position it trips a (non-illustrated) limit switch and furthermore causes (by non-illustrated means) the direction-reversing switch to reassume its illustrated position, so that upon the next activation of the start switch the ram 14 will again be caused to descend.

After a further accumulation of loose refuse, atop the refuse previously compacted during the ram stroke corresponding to curve No. 1, the start switch is again activated, and the ram 14 performs a second stroke. The variation in ram force as the ram 14 descends during the second stroke is shown by curve No. 2. Again, the ram force is approximately zero until the ram contacts the upper surface of the body of refuse, and then rises in a fluctuating manner until it reaches the value $P_k$, whereupon the direction-reversing switch is activated by the overload relay 19, thereby terminating the ram stroke. The position of the ram at the end of this second stroke is higher than at the end of the first stroke, because of the greater mass of compacted refuse under the ram.

After a further accumulation of loose refuse, atop the refuse compacted during the ram strokes corresponding to curve No. 1 and curve No. 2, the start switch is again activated. The rise in compacting force as the ram 14 descends is again a fluctuating rise. When the compacting force reaches a value on the solid-line curve, the relay 19 activates the motor-reversing switch, thereby terminating the ram stroke. The position of the ram at the end of this third stroke is higher than at the end of the first and second strokes, because of the greater mass of compacted refuse under the ram. It will be noted that the end-of-stroke compacting pressure achieved during the third stroke is somewhat less than $P_k$. This third stroke has been described and represented in FIG. 3 for explanatory purposes. In general, compacted refuse will not build up to the level of the end-of-stroke ram position in curve No. 3, because before such build-up can occur the amount of free space at the top of the container 15 and available for the accommodation of further loose refuse will become so small as to induce the human operator to empty the container or replace it with an empty container. Accordingly, a plurality of strokes will in general all be representable by curves which, like curves No. 1 and No. 2, end upon intersection with the straight line $P_k$.

If the compensation in question were not provided, curves No. 1 and No. 2 in FIg. 3 would not end upon intersection with straight line $P_k$, but would instead end only upon intersection with the dash-dot curve section above straight line $P_k$. This is because, without the compensation in question, the ram stroke terminates always when the motor current reaches a preselected and fixed value.

The compensation essentially involves terminating the ram stroke when the motor current reaches a value associated with the ram force $P_k$. This motor current value is a function of ram position and is readily determined. At any given ram position, the transmission ratio between the drive motor output torque and the ram force is known. To assure that, at any given position of the ram, the ram force does not exceed $P_k$, it is merely necessary to correspondingly limit the motor output torque at such ram position. Such limiting of the motor output torque for a particular ram position is straightforward, because in general the relationship between the motor output torque and the motor current is known; the motor output torque is limited to the value corresponding to the ram force $P_k$ at a particular ram position simply by correspondingly limiting the motor current which is allowed to flow at the particular ram position. The limiting of the motor current which is allowed to flow at the particular ram position is accomplished by appropriately setting the wiper position of potentiometer 21. What wiper position should be established for a particular ram position is easily determined, because the resistance of the potentiometer for each wiper position is known and because the ohmic resistance of the overload relay 19 is known. The value to which the motor current is to be limited for a particular ram position, and the response value of the current flowing through relay 19, on the basis of an elementary two-branch current-division computation, determine what the effective resistance of potentiometer 21 should be. Since the relationship between the effective potentiometer resistance and the potentiometer wiper setting is known, or easily determined, it follows that the potentiometer wiper setting for each ram position is readily determinable.

With the potentiometer wiper setting required for each ram position having been determined in the aforedescribed manner, it is merely necessary to couple the wiper of potentiometer 21 to the output shaft of the motor 16, via a linkage 22, and possibly also via the screw spindle 18 or via one of the levers of the parallelogram transmission 13, using if necessary an additional transmission 23 (such as a speed-reducing transmission). The linkage 22 (and/or the transmission 23) should be so configurated as to enforce upon the potentiometer wiper a position dependent upon the ram position (or equivalently dependent upon the extent of displacement of the parallelogram transmission) such that the effective potentiometer resistance has the proper value (already determined as explained above) for each position of the ram.

Figure 4:
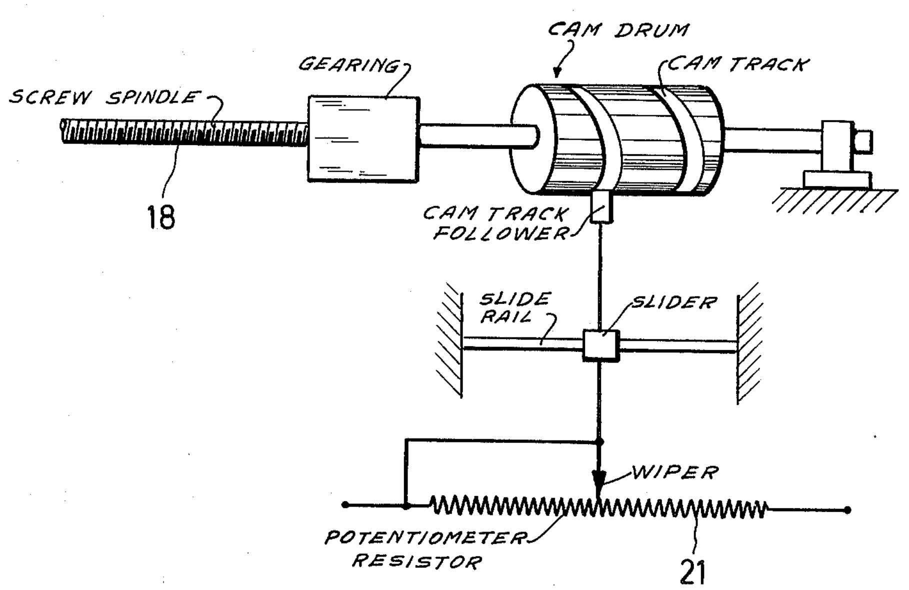
FIG. 4 schematically depicts details of the transmission 23 of FIG. 2.

FIG. 4 schematically depicts one such linkage for enforcing upon the wiper positions corresponding to the potentiometer resistances required for the different ram positions. This linkage is comprised of a cam drum driven off the screw spindle 18, through a speed-reducing gearing. The cam drum is provided with a cam track which is followed by a cam track follower. The follower moves a slider which rides on a slide rail. The slider is directly coupled to the potentiometer wiper. The configuration of the cam track is determined by first determining, in the manner explained above, the effective potentiometer resistance required for each ram position, and by then determining the wiper setting required for each ram position. The relationship between wiper position and ram position having been determined, the cam track is plotted on the surface of the cam drum and, for example, carved.

In FIG. 4, the relationship between effective potentiomteer resistance and wiper setting is advantageously linear — i.e., the potentiometer is preferably linearly wound — because this somewhat facilitates plotting of the cam curve. However, if the potentiometer is non-linearly wound, also a possibility in FIG. 4, the cam plotting procedure is essentially the same.

Use of a non-linearly wound potentiometer can eliminate the need for the cam drum and any equivalent linkage. For example, in FIG. 5, the wiper is mounted rigidly on a internally screw-threaded member which is threaded on the screw spindle 18, one of the two parallel levers of transmission 13 being pivoted at its upper end to this internally screw-threaded member. By winding the potentiometer wire in a non-linear distribution, the desired relationship between the effective potentiometer resistance and the position of the ram can be established in essentially the same manner as described above.

As a result, the end-of-stroke motor output torque is less for long strokes than for short strokes. This is proper, since it is desired that the end-of-stroke ram force be the same for both long and short strikes, at least for the predetermined range of stroke lengths, and since the transmission ratio of the parallelogram transmission is greater for long strokes than for short strokes.

As should be clear, to convert the uncompensated curve of FIG. 3 into the compensated curve, the effective resistance of potentiometer 21 should become larger and larger as the ram 14 descends. In this way, as the ram 14 descends, potentiometer 21 diverts from relay 19 a smaller and smaller fraction of the motor current. This diversion of a smaller and smaller fraction of motor current as the ram descends in effect causes the response current value of the current-responsive circuit 19, 20, 21 to decrease. Accordingly, as the ram moves further and further down, the value of drive motor output torque which when reached causes the ram stroke to terminate, becomes less and less.

With respect to FIGS. 2 and 4, it will be understood that the connection between the slider and the wiper in FIG. 4 corresponds to the linkage 22 in FIG. 2, whereas the gearing and cam-drum-and-follower connection between screw spindle 18 and the slider in FIG. 4 corresponds to the transmission 23 of FIG. 2, with the transmission 23 designed to match the wiper setting to the position of the ram, or equivalently to the extent of displacement of the parallel transmission.

Figure 5:
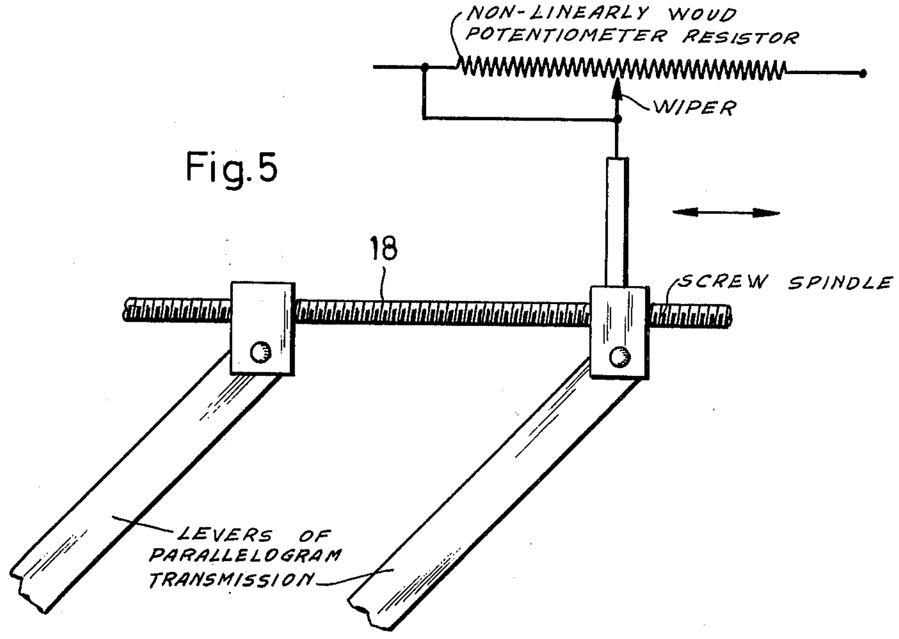
FIG. 5 schematically depicts details of a linkage coupling the wiper of potentiometer 21 of FIG. 2 to a part of the parallelogram transmission itself.

With respect to FIGS. 2 and 5, it will be understood that the connection between the wiper and the right lever of the parallel transmission corresponds to the linkage 22 of FIG. 2 without the use of the transmission 23.

There are evidently other ways of realizing the requisite relationship between the position of the ram, on the one hand, and the effective potentiometer resistance or equivalently wiper setting, on the other hand. The transmission 23 could alternatively be a lever or gear transmission or linkage, possibly making use of cam devices other than the cam drum and follower shown, or could include or consist of a wire or rope transmission.

Likewise, the potentiometer can have a non-linear relationship between wiper position and efffective resistance which is achieved by a means other than non-linear winding, for example by using a resistive strip having a non-uniform configuration which is cut in comformance to a plot made following the procedure explained above. With this approach, the linkage to the drive motor output shaft can have a linear transmission ratio, for example a direct take-off from the screw spindle 18.

In the illustrated embodiment, the inventive compensation expedient is applied only to a portion of the range of motion of the ram 14, namely the portion corresponding to the section of the bascissa within the range *h* and also under the straight line $P_k$. That the compensation is not applied to the lower portion of range *h* is not important, for the reasons explained above. Consequently, although the end-of-stroke pressing force $P_z$ will be less than $P_k$ in the lower portion of range *h*, this presents no difficulty, since in actual use of the compactor the end-of-stroke position of the ram will almost never fall within the uncompensated portion of range *h*. It will be clear that the inventive compensation can be applied to the entire range *h*, if desired, by choosing appropriate limit torques for each ram position of range *h*, in the same way as explained above for the upper portion of the range *h*.

Because the inventive compensation expedient makes it possible to preselect the end-of-stroke compacting force $P_z$ for every stroke length, the end-of-stroke compacting force $P_k$ can be chosen to have exactly the value sufficient for the desired degree of compacting and for crushing of hard and strong objects, such as cans, bottles, and the like.

In discussing the illustrated embodiment, it has been emphasized that the inventive compensation expedient makes the end-of-stroke compacting force $P_z$ independent of stroke length, over the whole range of stroke lengths to which the compensation expedient is applied. However, if it is desired that the end-of-stroke compacting force $P_z$ not be always the same over the whole range of stroke lengths to which the compensation expedient is applied, this likewise can be realized utilizing the inventive compensation expedient. For example, instead of the zero-slope straight line $P_k$ in FIG. 3 a straight line or a curve having a small positive or negative slope can be realized using the inventive expedient, in essentially the same way as discussed above.

It will be understood that each of the elements described above, or two or more together, may also find a useful application in other types of circuits and constructions differing from the types described above.

While the invention has been illustrated and described as embodied in the compensation of the displacement/transmission-ratio curve of a parallelogram transmission used in a household refuse compactor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, form the standpoint of prior art, fairly constitute essential characteristics of the generic or specific aspects of this invention.

What is claimed as new and desired to be protected by Letters Patent is set forth in the appended claims:

1. In an arrangement for generating and causing a pressing member to exert a pressing force, in combination, an electric drive motor; a parallelogram transmission connected to said pressing member for transmitting pressing force thereto; displacing means connecting said motor to said parallelogram transmission and operative for effecting displacement of said parallelogram transmission by transmitting thereto force from said motor; adjustable-setting switching means operative for terminating operation of said motor when the output force of said motor reaches a value corresponding to the setting of said switching means; and compensating means for compensating for the changes in transmission ratio which occur upon displacement of said parallelogram transmission by automatically adjusting the setting of said switching means in dependence upon the extent of the displacement of said parallelogram transmission.

2. An arrangement as defined in claim 1, wherein said electric drive motor has a rotating output shaft, and wherein said adjustable setting switching means comprises means operative for terminating operation of said motor when the output torque of said motor reaches a value corresponding to said setting.

3. An arrangement as defined in claim 2, wherein said electric drive motor has a motor current whose value is indicative of the value of the motor output torque, and wherein said adjustable-setting switching means comprises means operative for terminating operation of said motor when said motor current reaches a value corresponding to said setting.

4. An arrangement as defined in claim 1, wherein said compensating means comprises means for automatically so adjusting the setting of said switching means in dependence upon the extent of displacement of said parallelogram transmission that the pressing force being transmitted by said parallelogram transmission at the time of termination of operation of said motor is independent of the extent of displacement of said parallelogram transmission over a predetermined range of displacement of said parallelogram transmission.

5. An arrangement as defined in claim 4, wherein said adjustable-setting switching means comprises an overload relay and a potentiometer connected in parallel with each other and together connected in the current path of said electric drive motor, the wiper setting of said potentiometer constituting the setting of said switching means, and wherein said compensating means comprises means for automatically adjusting the wiper setting in depedence upon the extent of displacement of said parallelogram transmission.

6. An arrangement as defined in claim 5, wherein said means for automatically adjusting the wiperr setting is coupled to and driven by said displacing means.

7. An arrangement as defined in claim 5, wherein said potentiometer has a non-linear relationship between effective resistance and wiper setting.

8. An arrangement as defined in claim 5, wherein said potentiometer has a linear relationship between effective resistance and wiper setting, and wherein said means for automatically adjusting the wiper setting comprises a transmission transmitting to said wiper force from said electric drive motor and having a transmission ratio which is a function of the extent of displacement of said parallelogram transmission.

* * * * *